United States Patent
Yamamoto

(10) Patent No.: US 10,574,861 B2
(45) Date of Patent: Feb. 25, 2020

(54) READING APPARATUS, IMAGE PROCESSING PROGRAM, AND IMAGE PRODUCTION METHOD

(71) Applicant: SEIKO EPSON CORPORATION, Tokyo (JP)

(72) Inventor: Yasuhisa Yamamoto, Fukuoka (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 16/183,790

(22) Filed: Nov. 8, 2018

(65) Prior Publication Data
US 2019/0149701 A1 May 16, 2019

(30) Foreign Application Priority Data
Nov. 10, 2017 (JP) .................. 2017-216897

(51) Int. Cl.
*H04N 1/60* (2006.01)
*H04N 1/00* (2006.01)
*H04N 1/62* (2006.01)
*H04N 1/203* (2006.01)
*H04N 1/58* (2006.01)

(52) U.S. Cl.
CPC ....... *H04N 1/6094* (2013.01); *H04N 1/00814* (2013.01); *H04N 1/203* (2013.01); *H04N 1/2032* (2013.01); *H04N 1/58* (2013.01); *H04N 1/6058* (2013.01); *H04N 1/6086* (2013.01); *H04N 1/62* (2013.01)

(58) Field of Classification Search
CPC ........... H04N 1/00092; H04N 1/00909; H04N 1/4097
USPC .................................. 358/2.1, 3.26
See application file for complete search history.

(56) References Cited

U.S. PATENT DOCUMENTS

| | | | | |
|---|---|---|---|---|
| 6,954,290 B1* | 10/2005 | Braudaway | .......... | G06K 9/3283 358/3.26 |
| 7,602,995 B2* | 10/2009 | Araki | .................. | G06K 9/3283 358/3.26 |
| 7,924,477 B1* | 4/2011 | Malzbender | .......... | G06T 7/0004 358/474 |
| 8,023,766 B1* | 9/2011 | Bergman | ................. | G06K 9/34 358/3.26 |

(Continued)

FOREIGN PATENT DOCUMENTS

| | | |
|---|---|---|
| JP | 2006-084595 A | 3/2006 |
| JP | 2017-046342 A | 3/2017 |

(Continued)

*Primary Examiner* — Ted W Barnes
(74) *Attorney, Agent, or Firm* — Global IP Counselors, LLP

(57) ABSTRACT

A reading apparatus includes: a reading section configured to generate a first image being a read image of a first face of a document sheet and a second image being a read image of a second face of the document sheet; if there is a brightness change area including a bright part having a brightness change in a convex state and a dark part being in contact with the bright part and having a brightness change in a concave state at an identical position on both of the images, an identification section configured to identify the brightness change area as a wrinkle area; and an output section configured to output the first image having been subjected to image processing of the identified wrinkle area.

10 Claims, 9 Drawing Sheets

(56) References Cited

U.S. PATENT DOCUMENTS

| | | | | |
|---|---|---|---|---|
| 8,422,043 B2* | 4/2013 | Fujii | ............... | H04N 1/32149 |
| | | | | 358/1.14 |
| 8,437,497 B2* | 5/2013 | Fu | ............... | H04N 1/387 |
| | | | | 358/3.26 |
| 8,833,763 B2* | 9/2014 | Morikawa | ............... | B65H 5/00 |
| | | | | 271/263 |
| 9,385,150 B2* | 7/2016 | Ota | ............... | G07D 7/121 |
| 9,554,014 B2* | 1/2017 | Eguchi | ............... | H04N 1/4097 |
| 9,667,832 B2* | 5/2017 | Kanamaru | ............... | H04N 1/4097 |
| 2002/0106134 A1* | 8/2002 | Dundon | ............... | G01N 21/94 |
| | | | | 382/274 |
| 2004/0000652 A1* | 1/2004 | Guha | ............... | G01N 21/8901 |
| | | | | 250/559.45 |
| 2004/0169870 A1* | 9/2004 | Ahmed | ............... | G06T 3/403 |
| | | | | 358/1.8 |
| 2015/0256688 A1* | 9/2015 | Mizutani | ............... | H04N 1/00092 |
| | | | | 358/437 |
| 2016/0344897 A1* | 11/2016 | Eguchi | ............... | H04N 1/4097 |
| 2016/0352968 A1* | 12/2016 | Kanamaru | ............... | H04N 1/4097 |
| 2018/0213121 A1* | 7/2018 | Kanamaru | ............... | H04N 1/4097 |

FOREIGN PATENT DOCUMENTS

| | | | | | |
|---|---|---|---|---|---|
| JP | 2017046342 A | * | 3/2017 | | |
| JP | 6288521 B2 | * | 3/2018 | ............... | H04N 1/4097 |

* cited by examiner

READING APPARATUS, IMAGE PROCESSING PROGRAM, AND IMAGE PRODUCTION METHOD

BACKGROUND

1. Technical Field

The present invention relates to a reading apparatus, an image processing program, and an image production method.

2. Related Art

A document to be read by a scanner sometimes includes a wrinkle (also referred to as a crease of a document, or the like).

An image processing apparatus is disclosed that aligns images of a front side of a document and a back side of the document with each other, determines a non-concave and non-convex area in accordance with the pixel values of the aligned document images, obtains the average value of the pixel values of the document images of the front and the back in an area other than a non-concave and non-convex area, generates an isochromatic line connecting portions having pixel values similar to each other in the area other than the non-concave and non-convex area, determines an area having concave and convex portions (area corresponding to a wrinkle) of the document images in accordance with the average value of the pixel values and the isochromatic line, and corrects the images of the concave and convex area of the document images (refer to JP-A-2017-46342).

In the related art, if the color or the density differs between the front and the back of a document, or the like, it is difficult to suitably detect a wrinkle in a document. In addition, in JP-A-2017-46342, areas in which a character or an image is present in a concave or convex (wrinkle) part of a document are not targeted for correction (paragraph 0020 in JP-A-2017-46342).

SUMMARY

An advantage of some aspects of the invention is that the invention provides a reading apparatus capable of detecting a wrinkle in a document with high precision and capable of performing suitable processing on the detected wrinkle, an image processing program, and an image production method.

According to an embodiment of the invention, there is provided a reading apparatus including: a reading section configured to read a first face of a document sheet and a second face being a back side of the first face so as to generate a first image being a read image of the first face and a second image being a read image of the second face; if there is a brightness change area including a bright part having a brightness change in a convex state and a dark part being in contact with the bright part and having a brightness change in a concave state at an identical position on both the generated first image and the generated second image, an identification section configured to identify the brightness change area as a wrinkle area; and an output section configured to output the first image having been subjected to image processing of the identified wrinkle area.

With this configuration, if there is a brightness change area including a bright part having a brightness change in a convex state and a dark part being in contact with the bright part and having a brightness change in a concave state at the same position in the first image and the second image generated by reading both sides of the document sheet, the reading apparatus identifies the brightness change area as a wrinkle area as a reading result of a wrinkle in the document sheet. That is to say, a wrinkle area is identified in accordance with an area including a predetermined change pattern in brightness so that even if there is a difference in color or density of the document sheet between the first face (first image) and the second face (second image), it is possible to identify (detect) a wrinkle in the document sheet.

In the above-described embodiment of the invention, the output section may output the first image having been subjected to image processing that flattens color of the wrinkle area.

With this configuration, it is possible to output the first image from which a wrinkle has been removed. Of course, the output section may output the second image having been subjected to image processing that flattens the color of the wrinkle area in addition to the first image after such image processing. That is to say, an image may be output after only a single side of a document sheet has been subjected to the image processing, or an image may be output after both sides of the document sheet have been subjected to the image processing.

In the above-described embodiment of the invention, if the brightness change area is located at the identical position only in one of the first image and the second image, and the brightness change area located in the one of the images is continuous with the other area identified as the wrinkle area, the identification section may identify the brightness change area located in the one of the images as the wrinkle area.

With this configuration, if the brightness change area exists only in one of the first image and the second image at the identical position, and it is not possible to determine that the brightness change area exists in the other of the images due to the existence of a character, or the like, the brightness change area that exists in the one of the images is identified as a wrinkle area in accordance with the continuity to an adjacent wrinkle area. As a result, it is possible to identify a wrinkle in a document sheet with higher precision.

In the above-described embodiment of the invention, if the brightness change area is located at the identical position only in the first image, and the brightness change area in the first image is identified as the wrinkle area, the output section may output the first image having been subjected to image processing that flattens color of the wrinkle area identified in the first image, and if the brightness change area is located at the identical position only in the second image, and the brightness change area in the second image is identified as the wrinkle area, the output section may output the first image having been subjected to image processing that flattens an outside edge color of an object expressed in the first image for targeting an area of the first image side corresponding to a back of the wrinkle area identified in the second image.

With this configuration, it is possible to output the first image from which a wrinkle has been removed. Also, with this configuration, if a wrinkle and an object (for example, a character or a sign) overlap in the first image, it is possible to exactly remove the wrinkle that crosses an object while retaining the color of the object.

In the invention, a reading apparatus is not limited to a physically integrated apparatus and may be an apparatus including a plurality of components that are physically separated into a plurality of parts. Also, the technical ideas of the invention are realized by the other categories other than a reading apparatus. For example, it is possible to consider, as the invention, an image processing program that causes a computer to perform functions including: an acquisition function of acquiring a first image and a second image by reading a first face of a document sheet and a second face being a back side of the first face so as to generate the first image being a read image of the first face and the second image being a read image of the second face; if there is a brightness change area including a bright part having a brightness change in a convex state and a dark part being in contact with the bright part and having a brightness change in a concave state at a same position on both the acquired first image and the acquired second image, an identification function of identifying the brightness change area as a wrinkle area; and an output function of outputting the first image having been subjected to image processing on the identified wrinkle area. Also, a method corresponding to such an image processing program (image production method that produces the first image having subjected to image processing on the identified wrinkle area) and a computer readable storage medium that stores the program may be construed as the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a description will be given of embodiments of the invention with reference to the drawings. In this regard, the drawings are only examples for illustrating the present embodiment.

1. Schematic Explanation of Device Configuration

Figure 1:
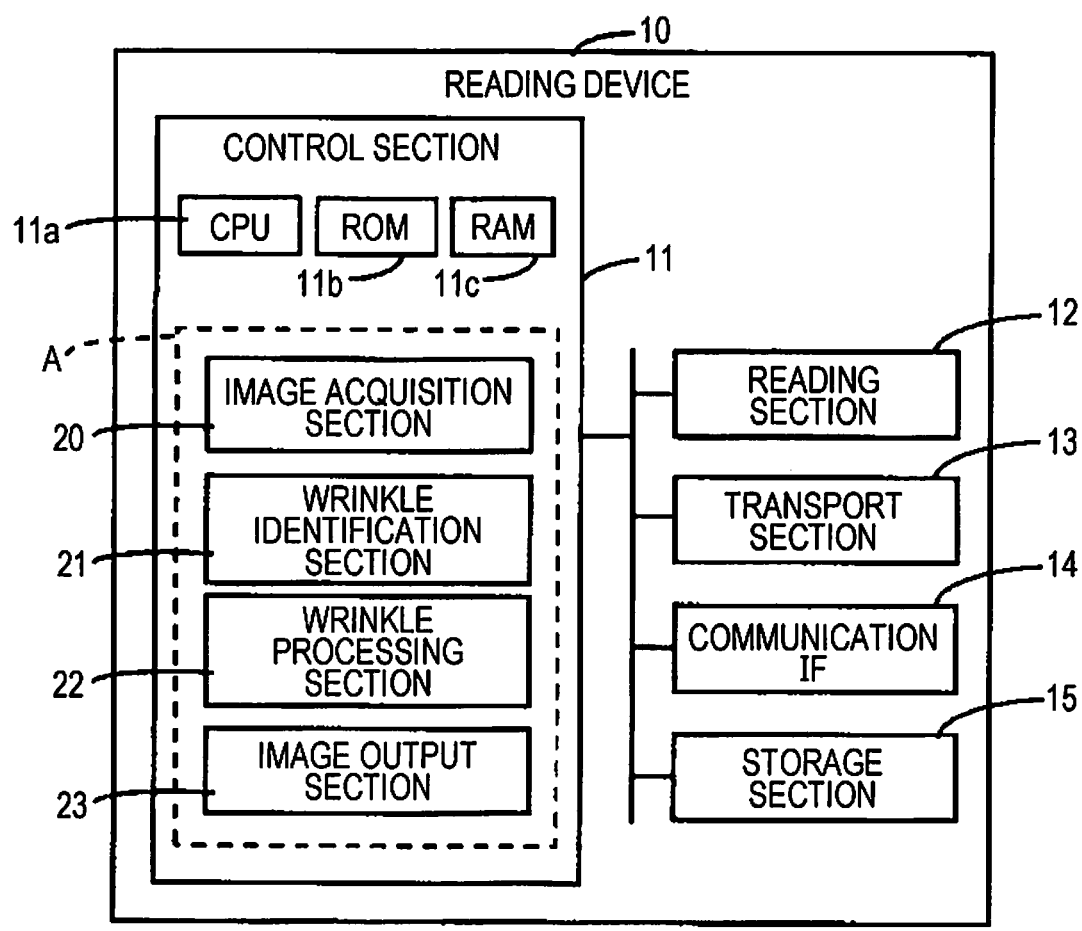
FIG. 1 is a simplified diagram illustrating the configuration of a reading apparatus.

FIG. 1 is a simplified diagram illustrating the configuration of a reading device 10 according to the present embodiment. The reading device 10 is a scanner capable of optically reading a document sheet and storing or externally outputting a reading result (read image). The reading device 10 is, for example, a document scanner, a scanner capable of transporting plural document sheets one by one and reading the document sheets consecutively.

The reading device 10 includes, for example, a control section 11, a reading section 12, a transport section 13, a communication interface (IF) 14, a storage section 15, and the like. The control section 11 suitably includes, for example, a controller (for example, a CPU 11a, an ASIC, or a combination of an ASIC and a CPU, or the like may be used), one or a plurality of ICs including a ROM 11b, a RAM 11c, and the like, and the other types of memory, or the like. The storage section 15 is a non-volatile storage device. The storage section 15 may be a part of the control section 11.

In the present embodiment, in the control section 11, the CPU 11a performs operation processing in accordance with the program stored in the ROM 11b, or the like by using the RAM 11c or the like as a work area so as to control the operation of the reading device 10. A program A is loaded into the control section 11 which realizes functions, such as functions of an image acquisition section 20, a wrinkle identification section 21, a wrinkle processing section 22, an image output section 23, and the like in accordance with the program A. The program A may be referred to as an image processing program or the like.

The transport section 13 is a transport mechanism that transports a document sheet placed on a document tray, not illustrated in the figure, in a predetermined transport direction under the control of the control section 11. The transport section 13 may include an auto document feeder (ADF) that transports plural document sheets placed on the document tray.

The reading section 12 is a unit for reading a document sheet under the control of the control section 11. As is well-known, the reading section 12 includes a light source, an optical system, an image pickup device, and the like. Light emitted by the light source is reflected by a document sheet transported by the transport section 13 and forms an image on the image pickup device through the optical system. The image pickup device then generates a read image as an electric signal in accordance with the light of the formed image. It is possible for the control section 11 to perform image processing, and the like on a read image output from the image pickup device and store the processed read image, for example, in the storage section 15 or transmit the processed read image to the outside via the communication IF 14.

The communication IF 14 is an interface (IF) that performs communication wiredly or wirelessly with the outside in compliance with a predetermined communication protocol that includes publicly known communication standards. For example, a PC (personal computer), not illustrated in the figure, is connected to the communication IF 14, and a read image of a document sheet is transmitted to the PC via the communication IF 14. Although not illustrated in the figure, the reading device 10 suitably includes a publicly known configuration, such as a display section for displaying visual information, an operation section for receiving an input operation from a user, such as a touch panel, a physical button, or the like. Also, the reading device 10 may be a multifunction printer that functions not only as a scanner, but also as a printer, a facsimile, and the like. Of course, a multifunction printer is capable of copying a document sheet by using a printer (printing mechanism that functions as a printer) to print a read image of the document sheet by the reading section 12.

Figure 2:
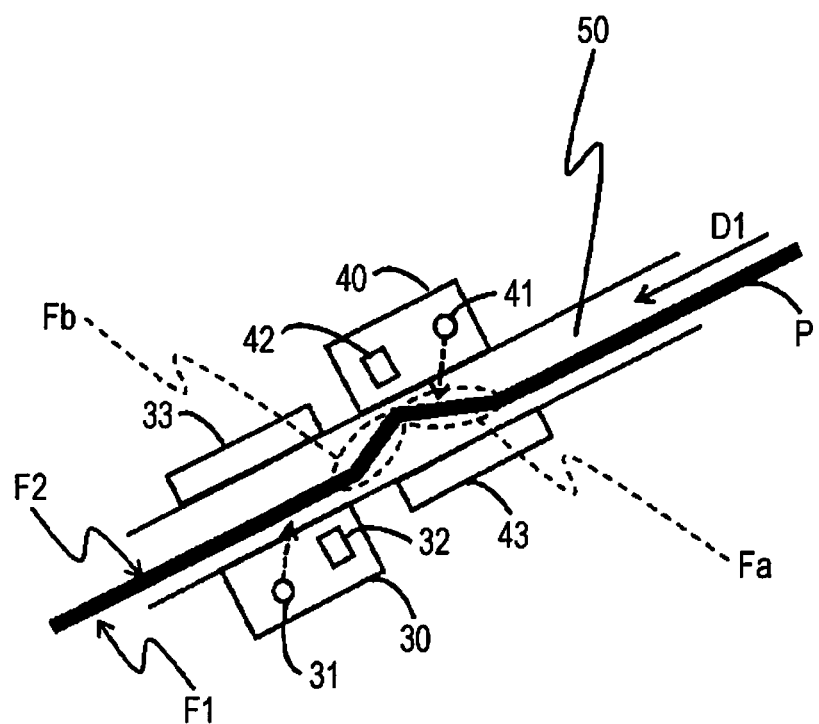
FIG. 2 is a simplified diagram illustrating a part of the configuration in a casing of the reading apparatus.

FIG. 2 simply illustrates a part of the configuration in a casing of the reading device 10 as viewed in the direction orthogonal to a transport direction D1 of a document sheet P. The document sheet P is transported by the transport section 13 on a predetermined transport path 50 in the transport direction D1. In the example in FIG. 2, it is assumed that the upper right in the figure is the upstream side in the transport direction D1, and the lower left is the downstream side in the transport direction D1. In the present embodiment, the reading device 10 has a configuration capable of reading both sides of a document sheet. In the present embodiment, a first face and a second face of a document sheet are only expressions for identifying both faces of a document sheet as a matter of convenience. When one of the faces of a document sheet is referred to as a first face, it is possible to refer to the other of the faces of the document sheet as a second face. If the first face is considered as a reference (front), the second face is to be considered as the back side, whereas if the second face is considered as a reference (front), the first face is to be considered as the back side. The reading section 12 (FIG. 1) includes a first reading section 30 for reading a first face F1 of a document sheet P and a second reading section 40 for reading a second face F2 of the document sheet P.

The first reading section 30 and the second reading section 40 are disposed at positions displaced from each other in the transport direction D1 and on opposite sides of the transport path 50, thereby sandwiching the transport path 50. In addition, a background plate 33 having a predetermined color is disposed at a position opposed to the first reading section 30, thereby sandwiching the transport path 50, and a background plate 43 having a predetermined color is disposed at a position opposed to the second reading section 40, thereby sandwiching the transport path 50. The first reading section 30 includes a light source 31 and a line sensor 32 (image pickup device) including a plurality of elements arranged in the direction perpendicular to the transport direction D1 (direction perpendicular to the page of FIG. 2). If there are no objects to be read between the first reading section 30 and the background plate 33, the light source 31 emits light onto the background plate 33, whereas if there is an object (the document sheet P) to be read between the first reading section 30 and the background plate 33, the light source 31 emits light onto the first face F1 of the document sheet P. The line sensor 32 reads an image of one line per read operation. Accordingly, the first reading section 30 repeats reading for each line by using the line sensor 32 at a predetermined frequency so as to generate a two-dimensional image, that is to say, a read image of the first face F1 of the document sheet P.

In the same manner, the second reading section 40 includes a light source 41 and a line sensor 42 (image pickup device) including a plurality of elements arranged along the direction perpendicular to the transport direction D1 (direction perpendicular to the sheet of FIG. 2). If there are no objects to be read between the second reading section 40 and the background plate 43, the light source 41 emits light onto the background plate 43, whereas if there is an object (the document sheet P) to be read between the second reading section 40 and the background plate 43, the light source 41 emits light onto the second face F2 of the document sheet P. The line sensor 42 reads an image of one line per read operation. Accordingly, the second reading section 40 repeats reading for each line by using the line sensor 42 at a predetermined frequency so as to generate a two-dimensional image, that is to say, a read image of the second face F2 of the document sheet P.

In the example in FIG. 2, not all portions of the document sheet P are flat; a wrinkle has occurred in a portion of the document sheet P. More specifically, there is a slope Fa on the upstream side in the transport direction D1, and there is a slope Fb on the downstream side in the transport direction D1 with a crease of a wrinkle having a convex state on the side of the second face F2 (concave state on the side of the first face F1) on part of the document sheet P. Here, in the example in FIG. 2, the light source 41 of the second reading section 40 is located further upstream than the line sensor 42 in the transport direction D1, and emits light onto the transport path 50 not perpendicularly, but obliquely with respect to the transport direction D1. Accordingly, when a wrinkle portion including slopes Fa and Fb of the document sheet P passes between the line sensor 42 and the background plate 43, more reflected light from the slope Fa than the reflected light from the plane part of the document sheet P enters the line sensor 42, and more reflected light from the plane part than the reflected light from the slope Fb enters the line sensor 42. As a result, the second face F2 side of the slope Fa is read as a relatively bright face, and the second face F2 side of the slope Fb is read as a relatively dark face.

Also, in the example in FIG. 2, the light source 31 of the first reading section 30 is located further downstream than the line sensor 32 in the transport direction D1, and emits light onto the transport path 50 not perpendicularly, but obliquely with respect to the transport direction D1. Accordingly, when a wrinkle portion including slopes Fa and Fb of the document sheet P passes between the line sensor 32 and the background plate 33, more reflected light from the slope Fa than the reflected light from a plane part of the document sheet P enters the line sensor 32, and more reflected light from the plane part than the reflected light from the slope Fb enters the line sensor 32. As a result, the first face F1 side of the slope Fa is read as a relatively bright face, and the first face F1 side of the slope Fb is read as a relatively dark face. In this regard, it may be understood that the shape of the document sheet P illustrated in FIG. 2 indicates the shape of a cross section parallel to the transport direction D1 of the document sheet P. Also, the shape of the document sheet P illustrated in FIG. 2 is an example, and a wrinkle having a crease of a convex state on the first face F1 side (concave state on the second face F2 side) may have occurred in a portion of the document sheet P as a matter of course.

Figure 3:
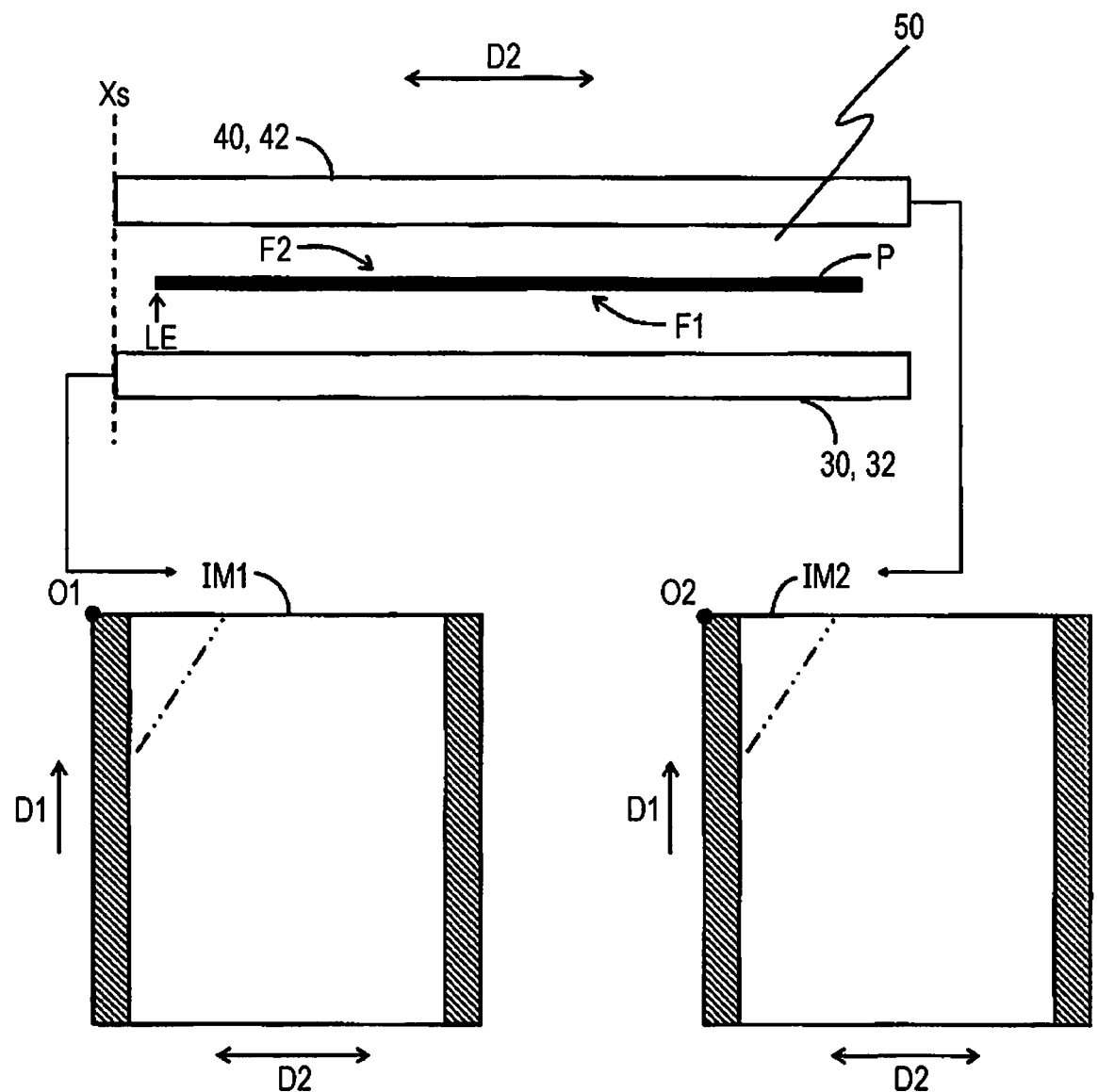
FIG. 3 is a simplified diagram illustrating a first reading section, a second reading section, a first image, and a second image.

FIG. 3 simply illustrates the first reading section 30, the second reading section 40, a first image IM1, and a second image IM2. The first image IM1 is a read image generated by the first reading section 30 reading the first face F1 of the document sheet P. The second image IM2 is a read image generated by the second reading section 40 reading the second face F2 of the document sheet P. The first image IM1 and the second image IM2 are constituted by corresponding raster data having color information for each pixel.

In FIG. 3, the first reading section 30, the second reading section 40, and the document sheet P are viewed from the upstream side to the downstream side in the transport direction D1 (FIG. 2). A reference sign D2 indicates the direction crossing (orthogonal to) the transport direction D1 and illustrates the longitudinal direction of the first reading section 30 and the second reading section 40, that is to say, the longitudinal direction of the line sensor 32 and the line sensor 42. In FIG. 3, it looks as if the first reading section 30 is opposed to the second reading section 40, thereby sandwiching the transport path 50. However, as is understood by referring to FIG. 2, the first reading section 30 is opposed to the background plate, thereby sandwiching the transport path 50, and the second reading section 40 is opposed to the background plate 43, thereby sandwiching the transport path 50. In FIG. 3, illustration of the background plates 33 and 43 is omitted. In addition, in FIG. 3, illustration of the wrinkle (concave and convex portion of the document sheet P due to the slopes Fa and Fb) on the document sheet P as illustrated in FIG. 2 is also omitted. In addition, in FIGS. 2 and 3, the thickness of the transport path 50 is expressed in a significantly enlarged manner. However, this is only for the sake of enhancing easiness of viewing.

FIG. 3 illustrates the first image IM1 and the second image IM2, and the corresponding relationships between the respective images and the directions D1 and D2. In FIG. 3, hatched areas included in the first image IM1, which are located at both ends in the direction D2, are reading results (the background plate image) of the background plate 33 outside the first face F1, which were read with the first face F1 when the first reading section 30 (line sensor 32) read the first face F1 of the document sheet P. Similarly, hatched areas included in the second image IM2 which are located at both ends in the direction D2 in FIG. 3 are reading results (the background plate image) of the background plate 43 outside the second face F2, which were read with the second face F2 when the second reading section 40 (line sensor 42) read the second face F2 of the document sheet P.

In this regard, the first image IM1 illustrated in FIG. 3 is a read result for a period from when the first reading section 30 has read the front end (the downstream side end part in the transport direction D1) of the document sheet P to when the first reading section 30 has read the rear end (the upstream side end part in the transport direction D1) of the document sheet P, and thus does not include the background plate image at the position corresponding to the top and the bottom (both ends in the transport direction D1). Similarly, the second image IM2 illustrated in FIG. 3 is a read result for a period from when the second reading section 40 has read the front end of the document sheet P to when the second reading section 40 has read the rear end of the document sheet P and thus does not include the background plate image at the position corresponding to the top and the bottom.

For ease of understanding, a dash-double-dot line included in each of the first image IM1 and the second image IM2 in FIG. 3 illustrates the existence of a wrinkle that has occurred in the document sheet P. The wrinkle included in the first image IM1 and the wrinkle included in the second image IM2 are the same wrinkle, that is to say, are the reading result produced by reading the same wrinkle that has occurred in the document sheet P from the first face F1 side and the reading result produced by reading the same wrinkle that has occurred in the document sheet P from the second face F2. In general, objects, for example, characters, symbols, and the like are printed on the first face F1 and/or the second face F2 of the document sheet P as a matter of course. First, a description will be given of the case where no objects are printed as an example. Accordingly, the reading result of such objects is not expressed in particular in the first image IM1 and the second image IM2 in FIG. 3.

2. Explanation of Image Processing (Identification and Removal of Wrinkle)

Figure 4:
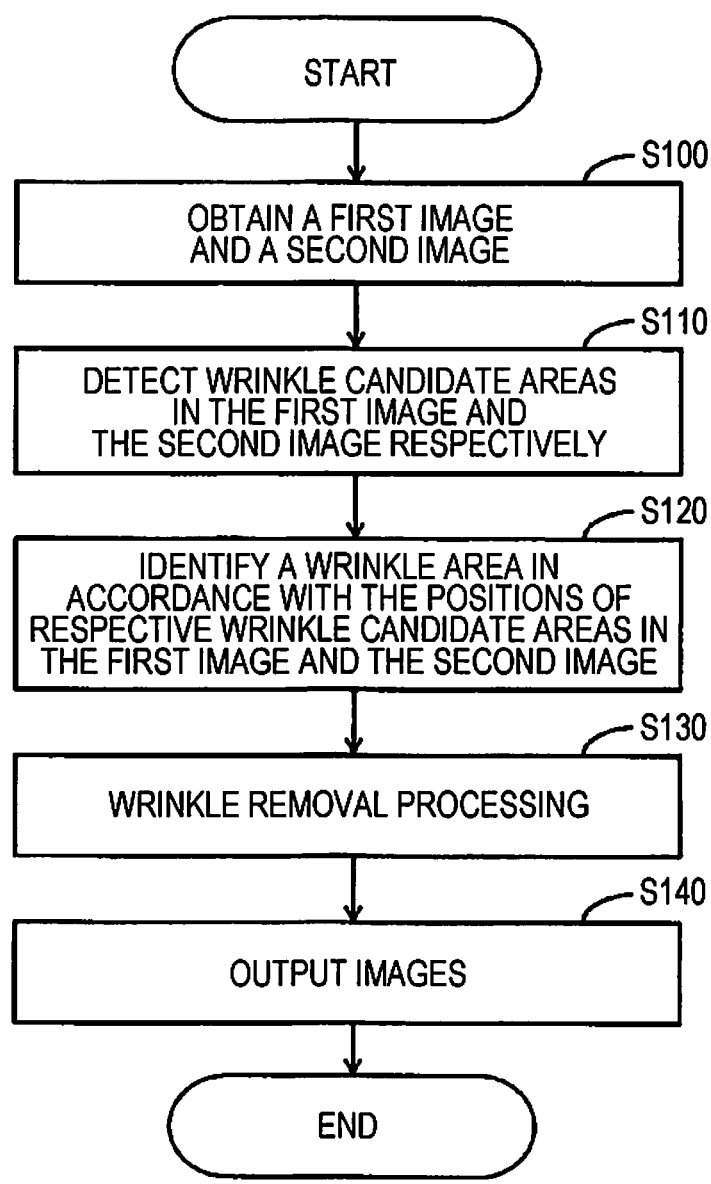
FIG. 4 is a flowchart illustrating the processing performed by a control section according to the present embodiment.

FIG. 4 is a flowchart illustrating the processing (image production method) performed by the control section 11 of the reading device 10 in accordance with a program A in response to a start instruction from a user to read a document sheet.

The control section 11 (image acquisition section 20) obtains the first image, which is a read image of the first face of the document sheet, and the second image, which is a read image of the second face of the document sheet, from the reading section 12 (step S100, acquisition process). For example, the image acquisition section 20 receives the output of the first image IM1 and the second image IM2 as illustrated in FIG. 3 from the reading section 12 and performs image processing of shading correction, and the like. In this regard, in the present specification, the directions of the first image and the second image are aligned so that it becomes easy to compare the information at the same position on the first face F1 and the second face F2 (the positions of the first face F1 side and the second face F2 side having a front-back relationship in the document sheet P). In reality, the processing for aligning the directions may be performed in this manner. However, the directions may not be aligned.

In step S110, the control section 11 (wrinkle identification section 21) detects a wrinkle candidate area from each of the first image and the second image obtained in step S100. The wrinkle identification section 21 sets a rectangular area having a predetermined size in sequence in each of the first image and the second image and determines whether or not there is a wrinkle candidate area in the rectangular area for each image, that is to say, detects a wrinkle candidate area.

Here, a description will be given with reference to FIG. 3 again. The control section 11 sets the upper left corner of the first image IM1 as an origin O1 of the first image IM1. Similarly, the control section 11 sets the upper left corner of the second image IM2 as an origin O2 of the second image IM2. Various definitions may be given to the origin O1. For example, a pixel produced by reading the leftmost (the left side when viewed from the upstream side to the downstream side in the transport direction D1. The same view is applied hereinafter) element of the line sensor 32 held by the first reading section 30 and located at the position corresponding to the front end of the document sheet P in the transport direction D1 is defined as the origin O1. In the same manner, a pixel produced by reading the leftmost element of the line sensor 42 held by the second reading section 40 and located at the position corresponding to the front end of the document sheet P in the transport direction D1 is defined as the origin O2.

The first reading section 30 and the second reading section 40 are arranged in the casing of the reading device 10 such that the position of the first reading section 30 (line sensor 32) in the direction D2 matches the position of the second reading section 40 (line sensor 42). For example, assuming that a predetermined position in the direction D2 is a reference position Xs, the first reading section 30 and the second reading section 40 are arranged such that the position of the leftmost element in the line sensor 32 and the position of the leftmost element in the line sensor 42 both match the reference position Xs. Accordingly, when any position in the first image IM1 is represented by two-dimensional coordinates with the origin O1 as the point of reference, and any position in the second image IM2 is represented by two-dimensional coordinates with the origin O2 as the point of reference, if the coordinates with the origin O1 the point of reference and the coordinates with the origin O2 as the point of reference have the same values, it can be said that these two coordinates indicate the respective positions of one point on the first face F1 side and on the second face F2 side in the document sheet P (that is to say, the same position). In this regard, for example, the respective upper left corners of the first image IM1 and the second image IM2 excluding the background plate images (a reading result of only the first face F1 and a reading result of only the second face F2) may be defined as the origins O1 and O2.

Before starting step S110, the wrinkle identification section 21 converts either the first image or the second image into a mirror image so as to make it easy to compare the information of the same position on the first face F1 and the second face F2 (the first face F1 side position and the second face F2 side position having a front and back relationship in the document sheet P) to align the directions. Thereby, as illustrated by the example in FIG. 3, both the first image IM1 and the second image IM2 determine that the downstream side in the transport direction D1 is the upside and determine the reading result of one end (for example, the left side end part LE) of the document sheet P in the direction D2 is the left side so as to align the directions. Of course, the wrinkle identification section 21 may be designed to identify a wrinkle without performing such processing for aligning the directions.

Figure 5:
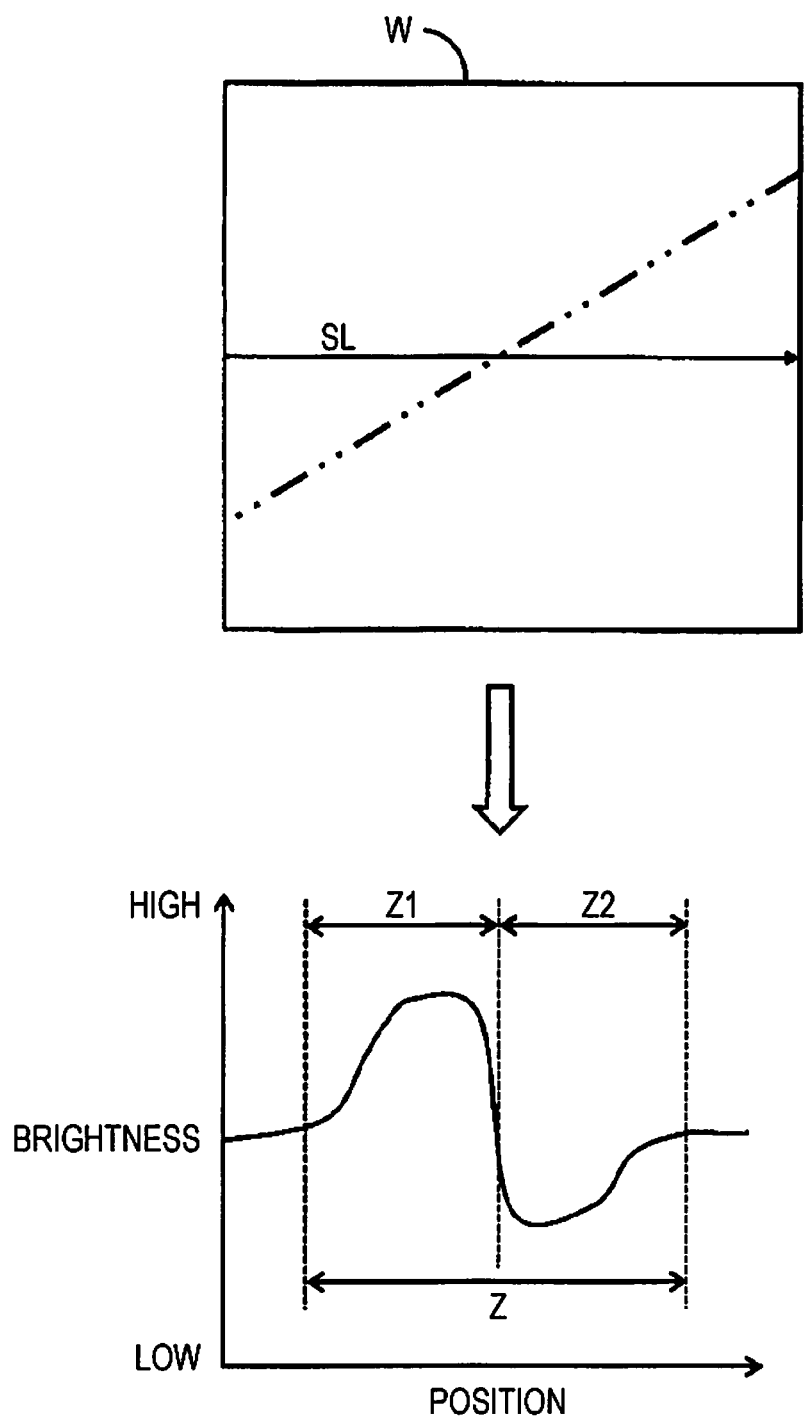
FIG. 5 is a diagram illustrating an example of a rectangular area and the brightness graph thereof.

FIG. 5 illustrates an example of a rectangular area used in step S110 and a brightness graph obtained from the rectangular area. The upper part in FIG. 5 illustrates an example of an enlarged rectangular area W set by the wrinkle identification section 21 in each of the first image and the second image as described above. The wrinkle identification section 21 sets a scanning line SL in the rectangular area W and analyzes the brightness change of the pixels in the scanning line SL. The pixels on the scanning line SL, that is to say, the individual pixels forming the first image or the second image have the grayscale values of, for example, RGB (red, green, and blue) as color information. Accordingly, it is possible for the wrinkle identification section 21 to calculate the brightness for each pixel, for example, the brightness in accordance with color information for each pixel using a publicly known conversion formula, or the like, and to determine a change in brightness for each pixel along the scanning line SL. In this regard, a dash-double-dot line included in the rectangular area W in FIG. 5 indicates a part of the existence of a wrinkle that has occurred on the document sheet P.

The lower part in FIG. 5 illustrates an example of the state of a brightness change for each pixel on one scanning line SL set in the rectangular area W by the graph. In the graph, the horizontal axis represents position (pixel position on the scanning line SL), and the vertical axis represents brightness (for example, the brightness of a pixel). As described for the example illustrated in FIG. 2, a change in brightness is observed at the periphery of a wrinkle in the document sheet with the crease of the wrinkle as a boundary. The scanning line SL illustrated in FIG. 5 passes the wrinkle (the crease of a wrinkle). Accordingly, a characteristic change in brightness as illustrated in the lower part of FIG. 5 is obtained from the scanning line SL. That is to say, the graph in the lower part of FIG. 5 indicates that the brightness value on the scanning line SL starts to increase from a relatively stable state with a predetermined slope or more, and after the increase has reached a peak, the brightness value decreases by an amount exceeding the increased amount. After the decrease has reached a minimum value, the brightness value recovers to the extent of the brightness value before the increase.

In the present embodiment, an area having such a characteristic brightness change is referred to as a "brightness change area" that includes a bright part having a brightness change in a convex state and a dark part being in contact with the bright part and having a brightness change in a concave state. A range Z1 (a part of the range of the scanning line SL) in the lower part of the graph in FIG. 5 corresponds to a bright part having a brightness change in a convex state, and a range Z2 (a part of the range of the scanning line SL) of the graph corresponds to a dark part having a brightness change in a concave state. For example, the slope Fa in FIG. 2 is read as the range Z1, and the slope Fb is read as the range Z2. Accordingly, a range Z, in which the range Z1 is continuous with the range Z2, corresponds to a brightness change area. In this regard, it is possible to determine that the range Z1 of the scanning line SL is, for example, a range in which the brightness starts to increase at a predetermined slope or more and decreases to the extent of the brightness value before the increase. In addition, it is possible to determine that the range Z2 of the scanning line SL is a range in which the brightness increases from the position in contact with the range Z1 to the extent of the brightness value before the increase.

In the lower part graph in FIG. 5, a bright part is determined in advance in response to a change in the pixel position on the scanning line SL, and a dark part is determined next. However, of course, a dark part may sometimes be determined in advance and a bright part may be determined next. That is to say, a brightness change area also includes the case where the brightness value on the scanning line SL starts to decrease from a relatively stable state with a slope less than or equal to a predetermined slope, and after the brightness value has reached a minimum value, the brightness value increases by an amount higher than the decreased amount, and after the increase reaches a peak, the brightness value recovers to the extent of the brightness value before the decrease. In either case, a range having a bright part and a dark part in contact with each other as a pair corresponds to a brightness change area.

The wrinkle identification section 21 sets scanning lines SL facing the same direction at predetermined intervals in sequence in rectangular areas W and determines whether or not there is a brightness change area for each of the scanning lines SL. At this time, the wrinkle identification section 21 calculates the average brightness of a plurality of pixels arranged in a direction orthogonal to the scanning line SL for each pixel position on the scanning line SL, and may use a change in the brightness calculated in this manner on the scanning line SL as the target of a determination as to whether or not there is a brightness change area. If the wrinkle identification section 21 determines that there is a brightness change area in one or a plurality of scanning lines SL set in a rectangular area W, the wrinkle identification section 21 detects the rectangular area W as a "wrinkle candidate area". In this regard, the scanning line SL illustrated in FIG. 5 faces the lateral direction (for example, the direction corresponding to the direction D2) of the rectangular area W. However, the wrinkle identification section 21 may set a scanning line SL that faces in a direction orthogonal to the scanning line SL in sequence in the rectangular area W and may determine whether or not there is a brightness change area in the same manner.

The wrinkle identification section 21 sets rectangular areas W in all the ranges of the first image IM1 (note that the background plate image is excluded) as a target in sequence and detects a wrinkle candidate area for each rectangular area W as described above. In the first image IM1, the wrinkle identification section 21 sets the position (range) of each rectangular area W with the origin O1 of the first image IM1 as a basis. In the same manner, the wrinkle identification section 21 sets rectangular areas W in all the ranges of the second image (note that the background plate image is excluded) as a target in sequence and detects a wrinkle candidate area for each rectangular area W as described above. In the second image IM2, the wrinkle identification section 21 sets the position (range) of each rectangular area W with the origin O2 of the second image IM2 as a basis second image.

In step S120, the wrinkle identification section 21 identifies a "wrinkle area" in accordance with the positions of a wrinkle candidate area in the first image and the second image, which were detected in step S110.

Figure 6:
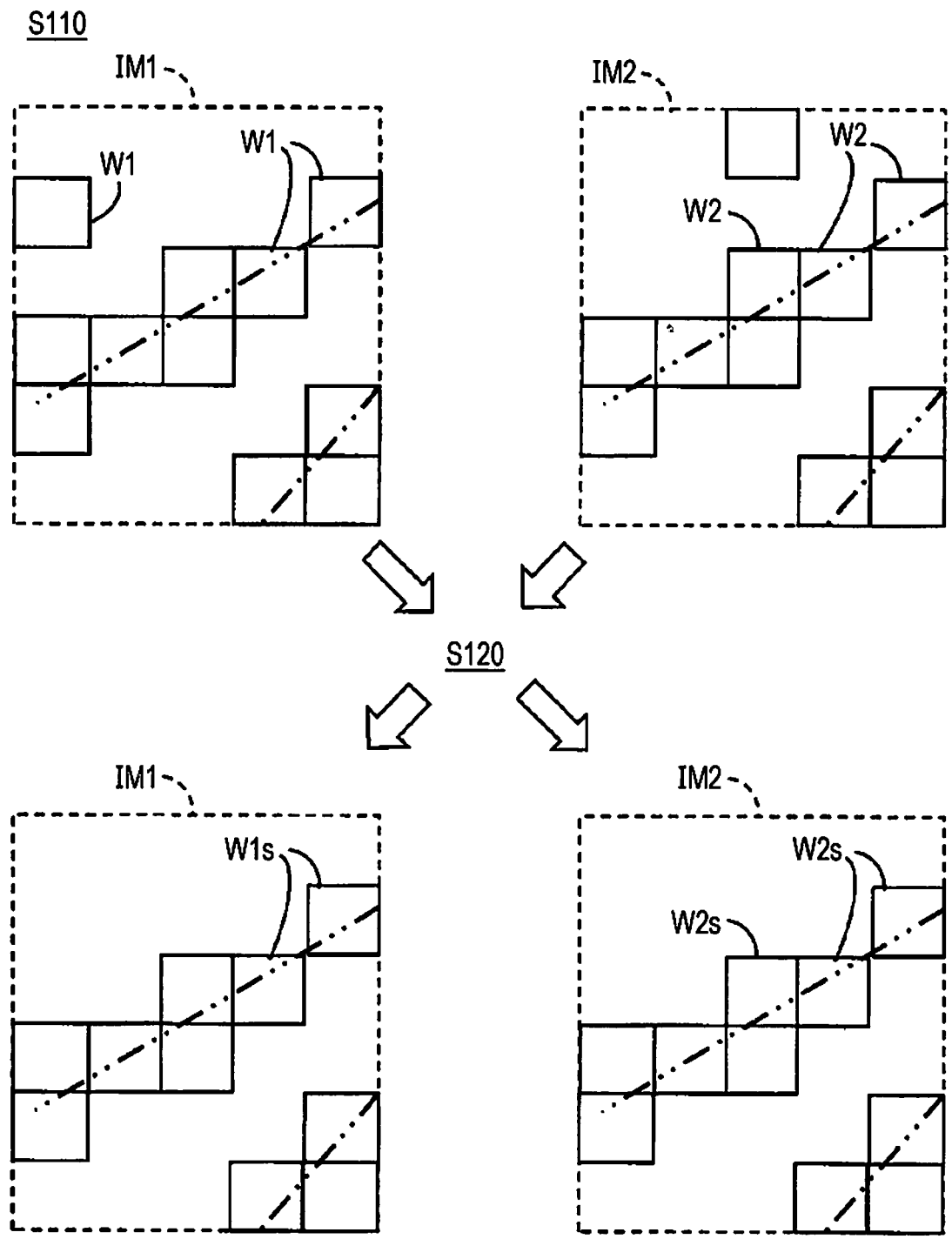
FIG. 6 is a diagram illustrating a specific example of the processing in step S120.

FIG. 6 is a diagram illustrating a specific example of the processing in step S120. The upper part of FIG. 6 illustrates a part of the range in the first image IM1 and a part of the range in the second image IM2 by broken-line rectangles respectively. Also, in the upper part of FIG. 6, a plurality of small rectangles illustrated by solid lines in the first image IM1 are rectangular areas (W1) detected as wrinkle candidate areas from the first image IM1 in step S110. In the same manner, in the upper part of FIG. 6, a plurality of small rectangles illustrated by solid lines in the second image IM2 are rectangular areas (W2) detected as wrinkle candidate areas from the second image IM2 in step S110.

The relationship between a part of ranges in the first image IM1 and a part of ranges in the second image IM2 illustrated in the upper part of FIG. 6 corresponds to a front and back relationship of a certain range in the document sheet P. If there is a wrinkle candidate area at the same position on both the first image and the second image, the wrinkle identification section 21 identifies those wrinkle candidate areas as a wrinkle area. For example, the position (position with the origin O1 as a basis) of a rectangular area W1 in the lower right corner in the first image IM1 illustrated by the upper part of FIG. 6 and the position (position with the origin O2 as a basis) of the rectangular area W2 in the lower right corner in the second image IM2 illustrated by the upper part of FIG. 6 are the same. Accordingly, the rectangular areas W1 and W2 in the lower right corners are both identified as wrinkle areas. That is to say, the wrinkle identification section 21 compares the first image IM1 illustrated by the upper part of FIG. 6 and the second image IM2 illustrated by the upper part of FIG. 6 and identifies all the combinations of the rectangular areas W1 and W2 located at the same position as wrinkle areas.

In FIG. 6, an example of existence of a wrinkle (part of a wrinkle) is illustrated by a dash-double-dot line in each of the first image IM1 and the second image IM2. A long wrinkle in the first image IM1 illustrated in FIG. 6 and a long wrinkle in the second image IM2 are the same wrinkle. In the same manner, a short wrinkle in the first image IM1 illustrated in FIG. 6 and a short wrinkle in the second image IM2 are the same wrinkle.

The lower part in FIG. 6 illustrates each rectangular area as a wrinkle area identified by the wrinkle identification section 21 as a result of step S120. That is to say, in the lower part in FIG. 6, a plurality of small rectangles denoted by solid lines in the first image IM1 are rectangular areas (W1s) that are identified as wrinkle areas in step S120 respectively. In the same manner, in the lower part in FIG. 6, a plurality of small rectangles denoted by solid lines in the second image IM2 are rectangular areas (W2s) that are identified as wrinkle areas in step S120. As is understood from the comparison between the upper part and the lower part in FIG. 6, a position where a wrinkle candidate area (the rectangular area W1 or the rectangular area W2) is detected from either one of the first image IM1 and the second image IM2 is not identified as a wrinkle area. As a result, for example, dust, a part of a design pattern of an object, and the like, that are not wrinkles, but are similar to wrinkles and exist on either one of the first face and the second face of the document sheet are not identified as wrinkle areas. Accordingly, the image range that overlaps a real wrinkle of a document sheet is identified as a wrinkle area with high precision.

In step S130, the control section 11 (the wrinkle processing section 22) performs wrinkle removal processing on the wrinkle areas identified in step S120. In this regard, an image to be processed in step S130 is the image of a face for which a read instruction is given to the reading device 10 in advance. In advance of a reading start by the reading device 10 (start transporting a document sheet by the transport section 13), it is possible for a user to set single-side reading of a document sheet or double-side reading in the reading device 10 via the operation section not illustrated in the figure, or the like.

In the present embodiment, if single-side reading of a document sheet is set, it is assumed that the control section 11 performs processing of step S130 and thereafter on the image read from a single face of the document sheet (here, the first image read from the first face). On the other hand, if double-side reading of a document sheet is set, the control section 11 performs processing of step S130 and thereafter on the images read from the both faces of the document sheet, that is to say, the first image read from first face and the second image read from the second face respectively. However, as is understood from the descriptions so far, in the present embodiment, regardless of whether either single-side reading or double-side reading is set, the reading section 12 reads both faces of a document sheet in order to identify a wrinkle area, and the control section 11 obtains the first image of the first face and the second image of the second face from the reading section 12 (step S100) and executes steps S110 and S120.

A description will be given of the case where the processing in step S130 is performed on the first image. In this case, in step S130, the wrinkle processing section 22 determines the first image (for example, the first image IM1 (note that the background plate image is excluded)) obtained in step S100 as a processing target and performs wrinkle removal processing for flattening the color (color change) of the wrinkle area identified in step S120 in the first image IM1.

Figure 7:
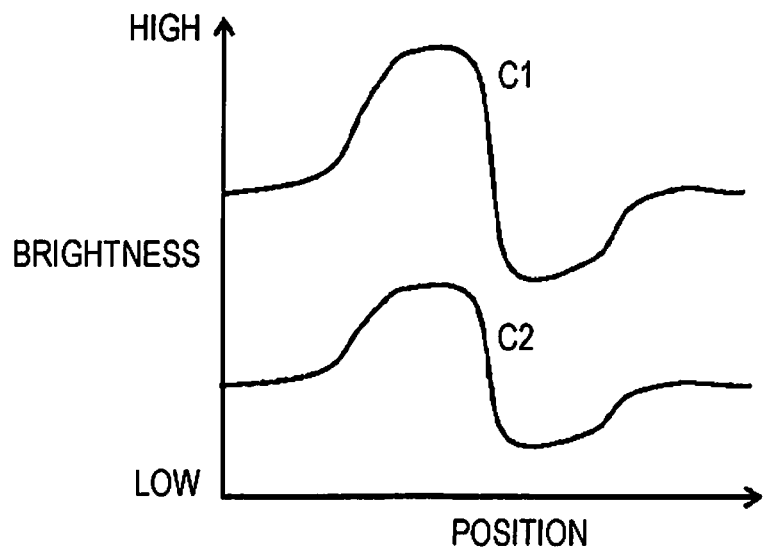
FIG. 7 is an explanatory diagram of wrinkle removal processing.
Figure 7:
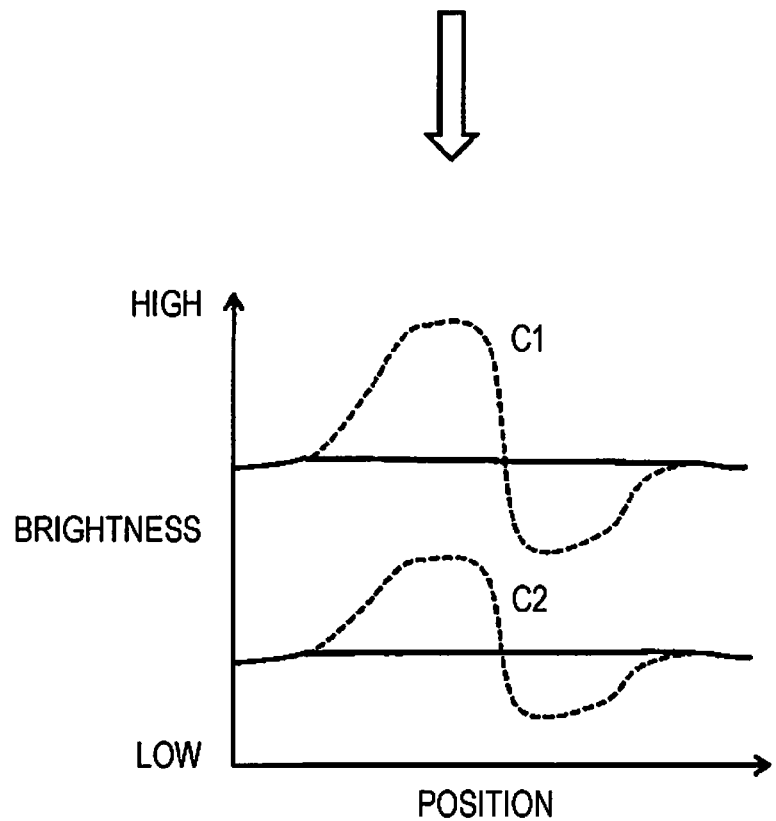

FIG. 7 is an explanatory diagram of the concept of wrinkle removal processing. The upper part of FIG. 7 illustrates a graph C1. How to read the graph C1 is the same as the way of reading the graph illustrated as an example in the lower part of FIG. 5. The graph C1 illustrates, as an example, the brightness change of pixels in one scanning line SL set as described above in one wrinkle area (rectangular area W1s) identified in the first image IM1 in step S120. The wrinkle processing section 22 performs image processing (wrinkle removal processing) for suppressing such a brightness change as a result. Specifically, the wrinkle processing section 22 connects the color information of one end pixel in the pixel range (range Z) on the scanning line SL, which has been determined as a brightness change area by the wrinkle identification section 21 in step S110, and the color information of the other end pixel by a straight line in a predetermined color space (for example, the RGB color space or the L*a*b* color space), and replaces the color of each pixel in the pixel range (range Z) on the scanning line SL with each color arranged on the straight line in the predetermined color space.

The lower part in FIG. 7 illustrates, by a solid line, the brightness change of the pixels on the scanning line SL, where the graph C1 was once detected, after the wrinkle removal processing described above was performed. That is to say, as illustrated by the lower part in FIG. 7, by the wrinkle removal processing, the graph C1 is changed from a state having a bright part and a dark part to a substantially flat state (state having nearly no concavity and convexity in brightness). In this regard, the color information of a pixel at one end and the color information of a pixel at the other end in the pixel range (range Z) on the scanning line SL, which has been determined as a brightness change area by the wrinkle identification section 21 in step S110, are often similar to each other. Accordingly, the wrinkle processing section 22 may replace the color of each pixel in the range Z with the average color information of the color information of the pixel at one end of the range Z and the color information of the pixel at the other end. Alternatively, more simply, the wrinkle processing section 22 may replace the color of each pixel in the range Z with either the color information of the pixel at one end in the range Z or the color information of the pixel at the other end. In step S130 targeted at the first image, the wrinkle processing section 22 performs the wrinkle removal processing for each of the scanning lines SL described above (the scanning line SL determined to include a brightness change area) on each of all the wrinkle areas (rectangular areas W1s) identified from the first image IM1 in step S120.

A description will also be given of the case where the processing in step S130 is performed on the second image. In this case, in step S130, the wrinkle processing section 22 performs wrinkle removal processing for flattening the color (color change) of the wrinkle areas identified from the second image 2 in step S120 on the second image (for example, second image IM2 (note that the background plate image is excluded)) obtained in step S100.

The upper part in FIG. 7 illustrates a graph C2. How to read the graph C2 is the same as the way of reading the graph illustrated as an example in the lower part of FIG. 5 and the graph C1. The graph C2 illustrates, as an example, the brightness change of pixels in one scanning line SL set as described above in one wrinkle area (rectangular area W2s) identified in the second image IM2 in step S120. The wrinkle processing section 22 performs image processing (wrinkle removal processing) for suppressing such a brightness change as a result. A specific way of performing the wrinkle removal processing is the same as described regarding the graph C1.

The lower part in FIG. 7 illustrates, by a solid line, the brightness change of the pixels on the scanning line SL, where the graph C2 was once detected, after the wrinkle removal processing described above was performed. That is to say, as illustrated by the lower part in FIG. 7, by the wrinkle removal processing, the graph C2 is changed from a state having a bright part and a dark part to a substantially flat state (state having nearly no concavity and convexity in brightness). In step S130, in the same manner as the processing targeted for the first image, the wrinkle processing section 22 performs the wrinkle removal processing for each of the scanning lines SL described above (the scanning line SL determined to include a brightness change area) on each of all the wrinkle areas (rectangular areas W2s) identified from the second image IM2 in step S120.

In step S140, the control section 11 (the image output section 23) performs image processing, such as cutting processing, or the like for deleting the background plate image and remaining the image of the document sheet, on the image having been subjected to the wrinkle removal processing in step S130, outputs the image after the image processing is performed, and terminates the flowchart in FIG. 4. As described above, if the single-side reading to a document sheet is set, the first image is subjected to the wrinkle removal processing in step S130, and thus in step S140, the image output section 23 outputs the first image having been processed in step S130. On the other hand, if the double-side reading of a document sheet is set, both the first image and the second image are subjected to the wrinkle removal processing in step S130, and in step S140, the image output section 23 outputs the first image and the second image having been processed in step S130.

Various destinations are considered as the output destinations of the image by the image output section 23. For example, if a user has instructed to store the read image in the reading device 10 in advance, the image output section 23 outputs the image to be output to the storage section 15 so as to store the image in the storage section 15 in step S140. Also, for example, if a user has instructed to store the read image in a predetermined PC or a FAX machine other than the reading device 10 in advance, the image output section 23 transfers the image to be output to the external PC or FAX machine via the communication IF 14 in step S140. Also, for example, if a user has instructed to copy a document sheet in advance, the image output section 23 outputs the image to be output to a printing mechanism not illustrated in the figure in step S140 and causes the printing mechanism to print the image to be output. Alternatively, if the reading device 10 includes a display unit, it is also thought that the image to be output is displayed on the display unit.

In this manner, according to the present embodiment, the reading device 10 includes the reading section 12 that reads a first face of a document sheet and a second face being the back side of the first face so as to generate a first image, which is a read image of the first face, and a second image, which is a read image of the second face. The image acquisition section 20 then obtains the first image and the second image (acquisition process). If there is a brightness change area including a bright part having a brightness change in a convex state and a dark part being in contact with the bright part and having a brightness change in a concave state at a same position on both the first image and the second image, the wrinkle identification section 21 identifies (identification process) the brightness change area (wrinkle candidate area including a brightness change area) as a wrinkle area, and the wrinkle processing section 22 and the output section 23 (at least) output (output process) the first image having been subjected to image processing (wrinkle removal processing) on the wrinkle areas.

That is to say, the reading device 10 determines, as a wrinkle candidate area, an area having a predetermined change pattern in brightness, that is to say, a brightness change area including a bright part having a brightness change in a convex state and a dark part being in contact with the bright part and having a brightness change in a concave state, and identifies the position having a wrinkle candidate area on the front and the back of the document sheet as a wrinkle area. For example, as illustrated by the upper part in FIG. 7, the graph C1 is detected from a rectangular area W that is relatively brighter than a rectangular area W from which the graph C2 is detected. However, in the present embodiment, both of the graphs C1 and C2 are determined as brightness change areas. Thereby, even if there is a difference in color or density between the first face (the first image) and the second face (the second image), for example, if the first face (the first image) of the document sheet is brighter (or darker) than the second face (second image) on the whole, it is possible to identify a wrinkle from a read image of a document sheet with high precision.

Here, a supplementary explanation is given to the processing in step S120 with reference to FIG. 6.

For example, even when wrinkle candidate areas are detected at the same position from both the first image IM1 and the second image IM2, if the range ratio of a bright part to a dark part in the wrinkle candidate area at the same position each on the first image IM1 side and the second image IM2 side is a predetermined difference or more, the wrinkle identification section 21 may not identify the first image IM1 side wrinkle candidate area and the second image IM2 side wrinkle candidate area at the same position as wrinkle areas. When the graph illustrated in the lower part in FIG. 5 is taken as an example, the ratio of a bright part to a dark part refers to the ratio of the length of the range Z1 (the number of pixels) to the length of the range Z2 (the number of pixels) in the brightness change area (range Z). That is to say, even when a wrinkle candidate area is detected at the same position on the first image IM1 side and the second image IM2 side, if the range ratio of a bright part to a dark part on the first image IM1 side and the range ratio of a bright part to a dark part on the second image IM2 side differs by a predetermined difference or more, it is possible to estimate that images similar to wrinkles, which are irrelevant on the first face F1 side and the second face F2 side with each other, are accidentally detected as wrinkle candidate areas. Accordingly, the wrinkle identification section 21 does not identify these wrinkle candidate area as wrinkle areas. Also, even when a wrinkle candidate area is detected at the same position on both the first image IM1 and the second image IM2, if the order of a bright part and a dark part in the wrinkle candidate areas at the same position on first image IM1 side and the second image IM2 side are different, the wrinkle identification section 21 may not identify the wrinkle candidate areas at the same position on the first image IM1 side and the second image IM2 side as wrinkle areas. This is because, for example, in the brightness change area (range Z), if there are a bright part on the left side and a dark part on the right side on one face as illustrated by the lower part in FIG. 5, and there are a bright part on the right side and a dark part on the left part on the other face, it is normally not possible for a document sheet to have a convex state on the front side and a convex state on the back side have at the same position. Accordingly, it is possible to estimate that images similar to wrinkles, which are irrelevant on the first face F1 side and the second face F2 side with each other, are accidentally detected as wrinkle candidate areas. Accordingly, the wrinkle identification section 21 does not identify these wrinkle candidate areas as wrinkle areas.

Also, even when wrinkle candidate areas are detected at the same position both from the first image IM1 and the second image IM2, if the respective directions of the brightness change areas in the wrinkle candidate areas at the same position on the first image IM1 side and the second image IM2 side differ, the wrinkle identification section 21 does not identify the wrinkle candidate areas at the same position on the first image IM1 side and the second image IM2 side as wrinkle areas. The direction of a brightness change area refers to a direction of the scanning line SL at the time when determined that the brightness change area exists. Even when wrinkle candidate areas are detected at the same position on the first image IM1 side and the second image IM2 side, if the respective directions of the brightness change areas included in the wrinkle candidate areas are only the longitudinal direction of the image in one of the wrinkle candidate areas and only the lateral direction of the image in the other of the wrinkle candidate areas, it is possible to estimate that images similar to wrinkles, which are irrelevant on the first face F1 side and the second face F2 side with each other, are accidentally detected as wrinkle candidate areas. Accordingly, the wrinkle identification section 21 does not identify these wrinkle candidate areas as wrinkle areas.

3. Variations

The present embodiment is not limited to the modes described above and includes various modes. Hereinafter, a description will be given of variations of the embodiment. Regarding the variations, a description will be given of points that differ from those of the embodiment described so far.

Figure 8:
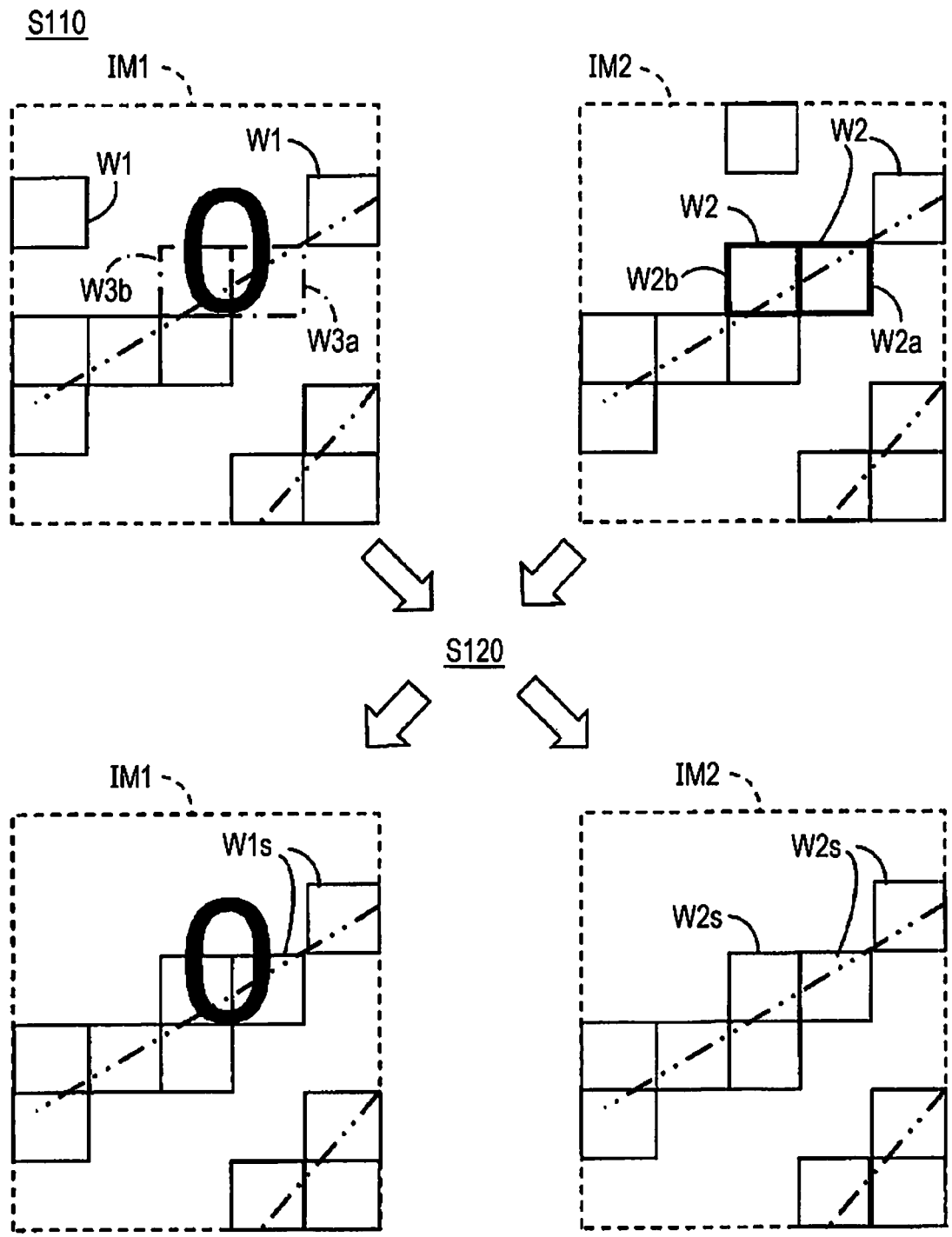
FIG. 8 is an explanatory diagram of the processing in step S120 according to a variation.

FIG. 8 is a specific example of the processing performed by step S120 and a diagram for explaining a state different from that in FIG. 6. How to view FIG. 8 is the same as the way of viewing FIG. 6. In the upper part in FIG. 8, small rectangles denoted by a plurality of solid lines in the first image IM1 are the respective rectangular areas (W1) that are detected as wrinkle candidate areas from the first image IM1 in step S110, and small rectangles denoted by a plurality of dash-dotted lines as wrinkle candidate areas in the first image IM1 in step S110 are part of the rectangular areas (non-wrinkle candidate areas) that are not detected as wrinkle candidate areas from the first image IM1 in step S110. Also, in the upper part in FIG. 8, small rectangles denoted by a plurality of solid lines in the second image IM2 are rectangular areas (W2) detected as wrinkle candidate areas from the second image IM2 in step S110.

In the example in FIG. 8, the first image IM1 includes a character (for example, a numeric character "0") and, a non-wrinkle candidate area denoted by dash-dotted lines partly overlaps part of the character. In other words, in step S110, the wrinkle identification section 21 determines that there are no brightness change areas in the scanning line SL in the rectangular area W, which is set at a position overlaps the character by the influence of the character. In this manner, a rectangular area W that is determined not to include a brightness change area by the influence of the character is a non-wrinkle candidate area denoted by the dash-dotted lines in FIG. 8.

Figure 9:
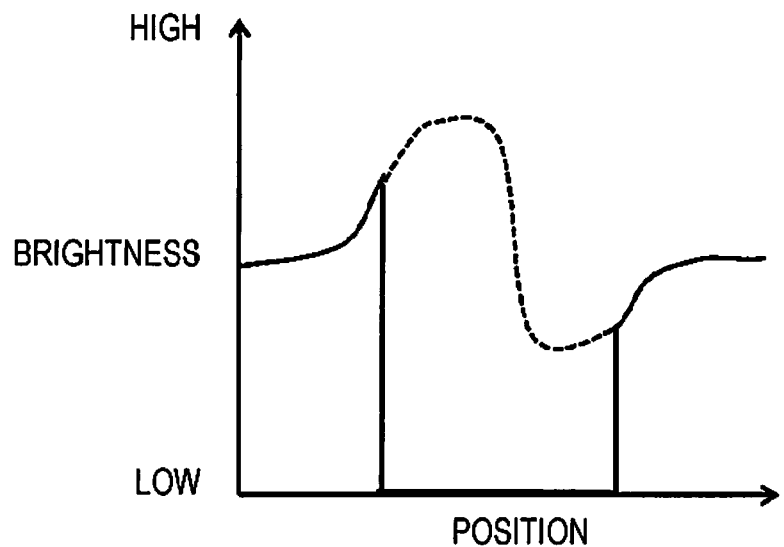
FIG. 9 is an explanatory diagram of the wrinkle removal processing according to the variation.
Figure 9:
Figure 9:
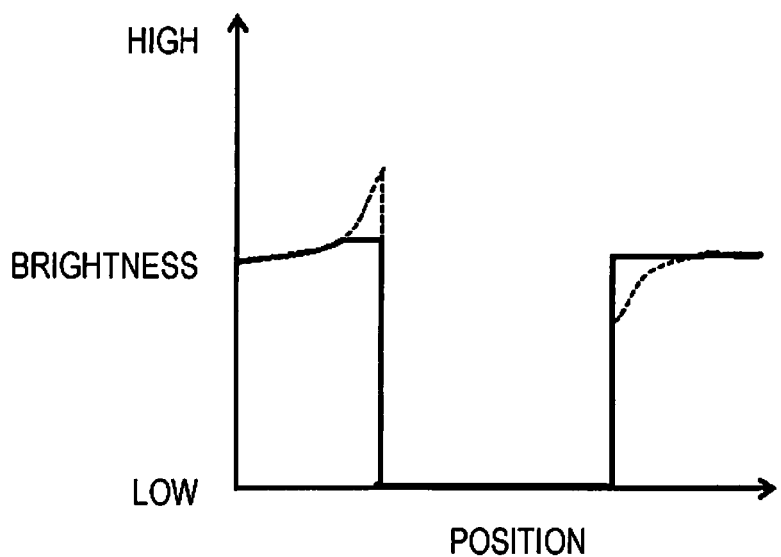

The upper part in FIG. 9 illustrates the state of a brightness change for each pixel on one scanning line SL set in a rectangular area W determined to have no brightness change area by the influence of a character as described above by a graph denoted by a solid line as an example. How to read the graph is the same as the way of reading the graph illustrated as an example in the lower part of FIG. 5. In the graph illustrated by the upper part in FIG. 9, brightness changes substantially vertically at the position of an edge pixel corresponding to a so-called edge of the character "0", and the brightness is stable (there is nearly no brightness change) at a fixed value (for example, a darkest value corresponding to black) in the range corresponding to the character. In step S110, when the wrinkle identification section 21 determines whether or not a brightness change area exists on the scanning line SL, if the wrinkle identification section 21 detects the existence of an edge pixel characteristic of an edge of a character or the existence of a range having a fixed value and sandwiched by edge pixels without a brightness change, the wrinkle identification section 21 determines that the range does not correspond to a brightness change area. Incidentally, in the graph in the upper part in FIG. 9, when it is assumed that there is no character "0", a brightness change is illustrated by a broken line. That is to say, the non-wrinkle candidate area illustrated by dash-dotted lines in the upper part in FIG. 8 is overlapped by a wrinkle (the dash-double-dot lines in the first image IM1), and thus should be determined as a wrinkle candidate area originally, but was not determined as a wrinkle candidate area by the existence of the character "0".

Here, among the rectangular areas W2 in the second image IM2 in the upper part in FIG. 8, attention is given to rectangular areas W2 denoted by bold lines. The rectangular areas W2 denoted by bold lines are areas detected as wrinkle candidate areas from the second image IM2 in step S110. However, the area at the same position on the first image IM1 side corresponds to the non-wrinkle candidate areas described above. The wrinkle candidate area detected in step S110, such as the rectangular areas W2 denoted by the bold lines, and a non-wrinkle candidate area at the same position on the back side of the image in which the wrinkle candidate area has been detected (the first image or the second image) is referred to as a one-sided wrinkle candidate area for convenience.

By the explanation so far, a one-sided wrinkle candidate area is not identified as a wrinkle area in step S120. However, in step S120 of the variation, the wrinkle identification section 21 identifies the one-sided wrinkle candidate area as a wrinkle area if the one-sided wrinkle candidate area satisfies the following predetermined conditions.

Condition 1: One-sided wrinkle candidate area is continuous with the other wrinkle area in an image in which a wrinkle candidate area has been detected.

Condition 2: One-sided wrinkle candidate area is continuous with the other wrinkle area in an image in which the wrinkle candidate area has not been detected.

Here, a rectangular area W2 (one-sided wrinkle candidate area) on the right side out of the two rectangular areas W2 denoted by bold lines in the second image IM2 in the upper part in FIG. 8 is referred to as a first area of interest W2a. First, regarding the first area of interest W2a, whether or not the conditions 1 and 2 are satisfied is specifically examined. In the condition 1, the statement in which a one-sided wrinkle candidate area is continuous with the other wrinkle area in an image from which a wrinkle candidate area has been detected refers to the state in which, for example, a wrinkle area exists at least in two adjacent areas or more among eight adjacent areas, namely up, down, left, right, upper right, lower right, lower left, and upper right areas of the one-sided wrinkle candidate area, and wrinkle areas exist in the adjacent areas of the both sides that sandwich the one-sided wrinkle candidate area (the right side and the left side of the one-sided wrinkle candidate area or the up side and the down side of the one-sided wrinkle candidate area). With reference to FIG. 8, it is possible to say that the first area of interest W2a is continuous with the other wrinkle area in the second image IM2, and thus the condition 1 is satisfied.

In the condition 2, the statement in which a one-sided wrinkle candidate area is continuous with the other wrinkle area in an image in which a wrinkle candidate area has not been detected refers to the state in which, for example, wrinkle areas exist at least in two adjacent areas or more among the eight adjacent areas, namely up, down, left, right, upper right, lower right, lower left, and upper right areas of the one-sided wrinkle candidate area. With reference to FIG. 8, it is possible to say that the first image IM1 side area (the right side non-wrinkle candidate area W3a out of the two non-wrinkle candidate areas denoted by dash-dotted lines in the upper part in FIG. 8) at the same position as that of the first area of interest W2a is continuous with the other wrinkle area in the first image IM1. Accordingly, the first area of interest W2a satisfies the condition 2.

In this manner, the wrinkle identification section 21 identifies the first area of interest W2a that satisfies the condition 1 and the condition 2 as a wrinkle area. Also, it is normally not thought that a wrinkle appears only either a first face or a second face of a document sheet. Accordingly, if the wrinkle identification section 21 identifies a wrinkle candidate area corresponding to a one-sided wrinkle candidate area as a wrinkle area, the wrinkle identification section 21 also identifies an area (non-wrinkle candidate area) at the same position of the back side image of an image in which the wrinkle candidate area has been detected as a wrinkle area. Accordingly, in the example in FIG. 8, the first area of interest W2a in the second image IM2 and the non-wrinkle candidate area W3a at the same position as that of the first area of interest W2a on the first image IM1 side are both identified as wrinkle areas (refer to the lower part in FIG. 8).

Next, the left side rectangular area W2 (one-sided wrinkle candidate area) out of the two rectangular areas W2 denoted by bold lines in the second image IM2 in the upper part in FIG. 8 is referred to as a second area of interest W2b. Regarding the second area of interest W2b, whether or not the conditions 1 and 2 are satisfied is specifically examined. As described above, the first area of interest W2a (and the first image IM1 side non-wrinkle candidate area W3a located at the same position as the first area of interest W2a) is identified as a wrinkle area. Accordingly, with reference to FIG. 8, it is possible to say that the second area of interest W2b is continuous with the other wrinkle area in the second image IM2, and thus the second area of interest W2b satisfies the condition 1. Also, with reference to FIG. 8, it is possible to say that the non-wrinkle candidate area (the left side non-wrinkle candidate area W3b out of the two non-wrinkle candidate areas denoted by dash-dotted lines in the upper part in FIG. 8) at the same position with second area of interest W2b is continuous with the other wrinkle area in the first image IM1, and thus the second area of interest W2b also satisfies the condition 2. The wrinkle identification section 21 identifies that the second area of interest W2b satisfying the condition 1 and the condition 2 as a wrinkle area. Accordingly, in the example in FIG. 8, both the second area of interest W2b in the second image IM2 and the first image IM1 side non-wrinkle candidate area W3b located at the same position with the second area of interest W2b are wrinkle areas (refer to the lower part in FIG. 8).

However, in consideration of the possibility that a character expressed in an image extends over a plurality of rectangular areas W so that a plurality of rectangular areas W might be determined as non-wrinkle candidate areas continuously, the wrinkle identification section 21 may change the condition 1 to the following condition 1' and change the condition 2 to the following condition 2' and may determine whether or not it is possible to identify the one-sided wrinkle candidate area as a wrinkle area.

Condition 1': A one-sided wrinkle candidate area is continuous with the other wrinkle area or the other one-sided wrinkle candidate area in an image in which a wrinkle candidate area has been detected.

Condition 2': In an image in which a wrinkle candidate area has not been detected, if a one-sided wrinkle candidate area is continuous with the other one-sided wrinkle candidate area, the one-sided wrinkle candidate area reaches a wrinkle area by following the other continuous one-sided wrinkle candidate area.

In this regard, in the variation, in order to simplify the processing, either condition 1 or condition 1' may be employed. That is to say, in step S120, the wrinkle identification section 21 may identify both the front and the back of a one-sided wrinkle candidate area as wrinkle areas if the one-sided wrinkle candidate area satisfies the condition 1 or the condition 1'.

With such a variation, when a brightness change area (wrinkle candidate area including a brightness change area) exists at the same position in only one of the first image and the second image, if the brightness change area that exists in the one of the images is continuous with the other area identified as a wrinkle area, the wrinkle identification section 21 identifies the brightness change area that exists in the image as a wrinkle area. A wrinkle in a document sheet normally occurs with a certain length rather than locally occurring in a very short range. Thus, for a wrinkle candidate area (one-sided wrinkle candidate area) that does not satisfy the condition in which a wrinkle candidate area is identified at the same position both in the first image and the second image, it is possible to identify the wrinkle candidate area as a wrinkle area in consideration of the relationship neighboring wrinkle areas, that is to say, the continuity of a wrinkle. Thereby, even if a brightness change area exists at the same position only in one of the first image and the second image, but it is not possible to determine the existence of a brightness change area due to the existence of a character, or the like in the other of the images, it is possible to identify a wrinkle in a document sheet with high precision (prevent a failure in detecting a wrinkle).

In step S130 in the variation, the wrinkle processing section 22 performs wrinkle removal processing on the image of a face to which the reading device 10 has given a read instruction in advance. First, a description will be given of the case of performing step S130 on the first image, specifically, the first image IM1 illustrated in the lower part in FIG. 8. In step S130, the wrinkle processing section 22 performs wrinkle removal processing for color flattening on all the wrinkle areas (rectangular areas W1s) identified from the first image F1 in step S120. In this case, regarding color flattening of the area (including a one-sided wrinkle candidate area identified as a wrinkle area in the variation) that has been detected as a wrinkle candidate area in step S110 and identified as a wrinkle area in step S120, the processing as already described with reference to FIG. 7, and the like ought to be performed. On the other hand, regarding the area (non-wrinkle candidate areas W3a and W3b) that has not been detected as a wrinkle candidate area in step S110 (that is to say, detected as a non-wrinkle candidate area), and after that identified as a wrinkle area in step S120 as described in the variation, the wrinkle processing section 22 performs wrinkle removal processing for flattening the color of the outside of the edge of an object (a character "0" in the example in FIG. 8) expressed in the first image IM1.

FIG. 9 is an explanatory diagram of the concept of wrinkle removal processing for flattening the color of the outside of the edge of an object according to the variation. The wrinkle processing section 22 performs image processing (wrinkle removal processing) for suppressing a brightness change in a range that does not correspond to an object among the brightness change illustrated in the upper part in FIG. 9 as a result. In this case, in a non-wrinkle candidate area (rectangular area) identified as a wrinkle area with identifying a wrinkle candidate area to be a one-sided wrinkle candidate area as a wrinkle area in step S120 as described above, the wrinkle processing section 22 identifies edge pixels corresponding to an edge of a character, or the like on the scanning line SL and determines a range (range having a fixed brightness) sandwiched by the identified edge pixels as a non-processing range. The wrinkle processing section 22 then replaces the color of each pixel such that the brightness of the range on the outside of the non-processing range on the scanning line SL and having a brightness change rate (the slope of the graph indicating a brightness change) higher than a predetermined slope is kept at a fixed value. Specifically, for example, the wrinkle processing section 22 replaces the color of pixels in the range on the outside of the non-processing range on the scanning line SL and having a brightness change rate higher than a predetermined slope with the same color as that of the color of the pixel more outside than the range having the brightness change rate higher than a predetermined slope.

The lower part in FIG. 9 illustrates as an example, by a solid line, a brightness change of the pixels on the scanning line SL from which the graph illustrated in the upper part in FIG. 9 has been detected and after having subjected to the wrinkle removal processing for flattening the color of the outside of an edge of an object according to the variation. That is to say, as illustrated by the lower part in FIG. 9, the graph has a substantially flat state in brightness in the pixel range that does not correspond to a character by the wrinkle removal processing.

A description will be given of the case of performing step S130 on the second image (the second image IM2 illustrated in the lower part in FIG. 8). In this case, regarding the color flattening of the area (including a one-sided wrinkle candidate area identified as a wrinkle area in the variation) detected as a wrinkle candidate area in step S110 and identified as a wrinkle area in step S120, the wrinkle processing section 22 ought to perform the processing as already described with reference to FIG. 7, and the like.

By the processing in step S130 and the succeeding step S140 according to such a variation, when a brightness change area (wrinkle candidate area including a brightness change area) exists only in the second image at the same position of the first image and the second image, and if the brightness change area that exists in the second image is identified as a wrinkle area, the output section (the wrinkle processing section 22 and the output section 23) outputs the first image having subjected to the image processing for flattening the color of the outside of the edge of the object (the character "0" in the example in FIG. 8) that is expressed in the first image, which targets the first image side area (non-wrinkle candidate areas W3a and W3b) located at the back of the wrinkle area identified in the second image. With this configuration, it is possible to output a first image from which the existence of a wrinkle has been removed. Also, with this configuration, if a wrinkle and an object are overlapped in the first image, it is possible to accurately remove, as far as the nearest part to the edge of the object, a wrinkle that crosses an object while maintaining the color of the object.

In FIG. 8, the example in which a character "0" is included in the first image IM1 side as an object. However, such an object may be included in the second image IM2 side as a matter of course. In that case, wrinkle candidate areas (rectangular areas W1) in the first image IM1 sometimes include a one-sided wrinkle candidate area as described above. Accordingly, by the processing in step S130 and the succeeding step S140, according to the variation, when a brightness change area (wrinkle candidate area including a brightness change area) exists only in the first image at the same position of the first image and the second image, and if the brightness change area that exists in the first image is identified as a wrinkle area, the output section (the wrinkle processing section 22 and the output section 23) is said to output the first image having been subjected to the image processing for flattening the color of the wrinkle area identified in the first image.

In the present embodiment and the variation, the image processing performed by the wrinkle processing section 22 in step S130 is not limited to the processing for flattening the color of the wrinkle area. The wrinkle processing section 22 ought to perform image processing for making inconspicuous a wrinkle in the wrinkle area identified in step S120 in the first image or the second image (difficult to be viewed by a user), and thus the processing other than flattening color may be performed. Also, the wrinkle processing section 22 may perform image processing in step S130 on the area other than the wrinkle area identified in step S120 or the wrinkle area or areas other than the wrinkle area so as to make the wrinkle inconspicuous as a result.

Also, it is possible to determine the order of the image processing including the wrinkle processing (from detection of a wrinkle candidate area to removal of a wrinkle) in the design of the program A in any way. The entire image processing including the wrinkle processing may be performed in the reading device 10, whereas a part of or the entire image processing may be performed by a PC, or the like. That is to say, a scan application installed on a PC may obtain a first image and a second image from the reading device 10 and may perform the processing in step S110 and after that. The wrinkle processing itself is not necessary to be performed all at once, and, for example, identification of a wrinkle candidate area may be executed in the reading device 10, and the processing after that may be performed by a device, such as a PC, or the like. In this case, it is possible to regard the entirety including the reading device 10 and the device, such as the PC, and the like as the reading apparatus described in the claims.

Also, the detection of a wrinkle candidate area and the identification of a wrinkle area may be performed using a monochrome analysis image produced by reducing the resolution and the number of grayscales of the first image and the second image obtained in step S100. Next, the wrinkle removal processing may be performed on the color image (the first image and the second image obtained in step S100) having the original resolution and the original number of grayscales using the information of the identified wrinkle area.

The entire disclosure of Japanese Patent Application No. 2017-216897, filed Nov. 10, 2017 is incorporated by reference herein.

What is claimed is:

1. A reading apparatus comprising:
   a processor constituting:
   a reading section configured to read a first face of a document sheet and a second face being a back side of the first face so as to generate a first image being a read image of the first face and a second image being a read image of the second face;
   if there is a brightness change area including a bright part having a brightness change in a convex state and a dark part being in contact with the bright part and having a brightness change in a concave state at an identical position on both the generated first image and the generated second image, an identification section configured to identify the brightness change area as a wrinkle area; and
   an output section configured to output the first image having been subjected to image processing of the identified wrinkle area,
   wherein if the brightness change area is located at the identical position only in one of the first image and the second image, and the brightness change area located in the one of the first image and the second image is continuous with another wrinkle area, the identification section identifies the brightness change area located in the one of the first image and the second image as the wrinkle area.

2. The reading apparatus according to claim 1,
   wherein the output section outputs the first image having been subjected to image processing that flattens color of the wrinkle area.

3. The reading apparatus according to claim 1,
   wherein if the brightness change area is located at the identical position only in the first image, and the brightness change area in the first image is identified as the wrinkle area, the output section outputs the first image having been subjected to image processing that flattens color of the wrinkle area identified in the first image, and
   if the brightness change area is located at the identical position only in the second image, and the brightness change area in the second image is identified as the wrinkle area, the output section outputs the first image having been subjected to image processing that flattens an outside edge color of an object expressed in the first image for targeting an area of the first image side corresponding to a back of the wrinkle area identified in the second image.

4. A reading apparatus comprising:
   a processor constituting:
   a reading section configured to read a first face of a document sheet and a second face being a back side of the first face so as to generate a first image being a read image of the first face and a second image being a read image of the second face;
   if there is a brightness change area including a bright part having a brightness change in a convex state and a dark part being in contact with the bright part and having a brightness change in a concave state at an identical position on both the generated first image and the generated second image, an identification section configured to identify the brightness change area as a wrinkle area; and
   an output section configured to output the first image having been subjected to image processing of the identified wrinkle area,
   wherein if the bright part is located at an identical position in both the first image and the second image, and the dark part is located at an identical position in both the first image and the second image, the identification section identifies the brightness change area as a wrinkle area.

5. The reading apparatus according to claim 4,
   wherein the output section outputs the first image having been subjected to image processing that flattens color of the wrinkle area.

6. An image production method comprising:
   acquiring a first image and a second image by reading a first face of a document sheet a sheet and a second face being a back side of the first face so as to generate the first image being a read image of the first face and the second image being a read image of the second face;
   if a brightness change area including a bright part having a brightness change in a convex state and a dark part being in contact with the bright part and having a brightness change in a concave state is located at an identical position on both the acquired first image and the acquired second image, identifying the brightness change area as a wrinkle area; and
   outputting the first image having been subjected to image processing of the identified wrinkle area,
   wherein if the brightness change area is located at the identical position only in one of the first image and the second image, and the brightness change area located in the one of the first image and the second image is continuous with another wrinkle area, identifying the brightness change area located in the one of the first image and the second image as the wrinkle area.

7. The image production method according to claim 6, wherein the outputting of the first image includes outputting the first image having been subjected to image processing that flattens color of the wrinkle area.

8. The image production method according to claim 6, wherein if the brightness change area is located at the identical position only in the first image, and the brightness change area in the first image is identified as the wrinkle area, the outputting of the first image includes outputting the first image having been subjected to image processing that flattens color of the wrinkle area identified in the first image, and if the brightness change area is located at the identical position only in the second image, and the brightness change area in the second image is identified as the wrinkle area, the outputting of the first image includes outputting the first image having been subjected to image processing that flattens an outside edge color of an object expressed in the first image for targeting an area of the first image side corresponding to a back of the wrinkle area identified in the second image.

9. An image production method comprising:

acquiring a first image and a second image by reading a first face of a document sheet a sheet and a second face being a back side of the first face so as to generate the first image being a read image of the first face and the second image being a read image of the second face;

if a brightness change area including a bright part having a brightness change in a convex state and a dark part being in contact with the bright part and having a brightness change in a concave state is located at an identical position on both the acquired first image and the acquired second image, identifying the brightness change area as a wrinkle area; and outputting the first image having been subjected to image processing of the identified wrinkle area, wherein if the bright part is located at an identical position in both the first image and the second image, and the dark part is located at an identical position in both the first image and the second image, identifying the brightness change area as a wrinkle area.

10. The image production method according to claim 9, wherein the outputting of the first image includes outputting the first image having been subjected to image processing that flattens color of the wrinkle area.

\* \* \* \* \*